(12) United States Patent
De Rossi et al.

(10) Patent No.: US 9,104,041 B2
(45) Date of Patent: Aug. 11, 2015

(54) OPTICAL SYSTEM DETERMINATION ACCORDING TO ADVANCED CRITERIA

(75) Inventors: Hélène De Rossi, Charenton le Pont (FR); Fabien Muradore, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 1115 days.

(21) Appl. No.: 13/124,757

(22) PCT Filed: Oct. 16, 2009

(86) PCT No.: PCT/EP2009/063569
§ 371 (c)(1),
(2), (4) Date: Apr. 18, 2011

(87) PCT Pub. No.: WO2010/043704
PCT Pub. Date: Apr. 22, 2010

(65) Prior Publication Data
US 2011/0202286 A1    Aug. 18, 2011

(30) Foreign Application Priority Data

Oct. 16, 2008  (EP) ............................. 08305693

(51) Int. Cl.
| | | |
|---|---|---|
| *G06F 11/30* | (2006.01) | |
| *G02C 7/02* | (2006.01) | |
| *G02C 7/06* | (2006.01) | |

(52) U.S. Cl.
CPC *G02C 7/02* (2013.01); *G02C 7/024* (2013.01); *G02C 7/028* (2013.01); *G02C 7/061* (2013.01)

(58) Field of Classification Search
CPC .......... G02C 7/02; G02C 7/061; G02C 7/028; G02C 7/024; G02C 7/027; G02C 7/025

USPC .......... 702/19, 182; 351/177, 159.73, 159.77, 351/159.41
See application file for complete search history.

(56) References Cited

U.S. PATENT DOCUMENTS

| | | | |
|---|---|---|---|
| 6,382,789 B1 | 5/2002 | Baudart et al. | |
| 2003/0107706 A1* | 6/2003 | Rubinstein et al. | ........... 351/177 |

(Continued)

FOREIGN PATENT DOCUMENTS

| | | |
|---|---|---|
| EP | 193 9 668 A1 | 7/2008 |
| FR | 98-12109 | 3/2000 |

(Continued)

OTHER PUBLICATIONS

Bourdoncle et al. "Traps in Displaying Optical Performances of a Progressive-Addition Lens." Applied Optics. vol. 31, n. 19; Jul. 1, 1992.

Allione et al. "Application of Optimization in Computer-Aided Opthalmic Lens Design." SPIE. vol. 3737, Europto-Conference on Design and Engineering of Optical Systems. Berlin. May 1999.

(Continued)

*Primary Examiner* — Janet Suglo
*Assistant Examiner* — Stephanie Bloss
(74) *Attorney, Agent, or Firm* — Cozen O'Connor

(57) ABSTRACT

A method implemented by computer means for calculating by optimization an optical system for example an ophthalmic lens according to at least one criterion among the following list consisting of: ocular deviation, object visual angular field in central vision, image visual angular field in central vision, pupil field ray deviation, object visual angular field in peripheral vision, image visual angular field in peripheral vision, prismatic deviation in peripheral vision, magnification in peripheral vision, lens volume, magnification of the eyes, temple shift, or a variation of preceding criteria.

14 Claims, 8 Drawing Sheets

(56) References Cited

U.S. PATENT DOCUMENTS

| | | | |
|---|---|---|---|
| 2004/0114100 A1* | 6/2004 | Welk et al. ............... | 351/159 |
| 2006/0209255 A1* | 9/2006 | Donetti et al. ............ | 351/177 |
| 2009/0244480 A1* | 10/2009 | De Gaudemaris et al. ... | 351/169 |
| 2010/0191504 A1* | 7/2010 | Esser et al. ............... | 702/182 |

FOREIGN PATENT DOCUMENTS

| | | |
|---|---|---|
| WO | WO 99/04307 A1 | 1/1999 |
| WO | WO 00/04414 A1 | 1/2000 |
| WO | WO 01/92948 A1 | 12/2001 |
| WO | WO 03/048841 A1 | 6/2003 |
| WO | WO 2005/026825 A1 | 3/2005 |
| WO | WO 2007/082268 A2 | 7/2007 |
| WO | WO 2007/092853 A2 | 8/2007 |

OTHER PUBLICATIONS

Williams et al. "Off-axis Optical Quality and Retinal Sampling in the Human Eye." Vision Research, Pergamon Press, Oxford, GB. vol. 36, No. 8. Apr. 1, 1996.

Jalie, M. "Progressive Lenses Part 2, The New Generation." Optometry Today, Association of Optometrists, London, GB. Jun. 17, 2005, pp. 35-45.

Achiron, L. R. et al. "The Effect of Relative Spectacle Magnification on Aniseikonia." Journal of the American Optometric Association, American Optometric Association. St. Louis, US. vol. 69, No. 9. Sep. 1, 1998, pp. 591-599.

Schikorra et al., "Einstärken-und Mehrstärken-Brillengläser", Verlag Der Deutschen Optikerzeitung, Dusseldorf, DE, Jan. 1, 1994, pp. 15-22.

* cited by examiner

OPTICAL SYSTEM DETERMINATION ACCORDING TO ADVANCED CRITERIA

RELATED APPLICATIONS

This is a U.S. National Phase Application under 35 USC 371 of International Application PCT/EP2009/063569 filed on Oct. 16, 2009.

This Application claims the priority of European Application No. 08305693.7 filed Oct. 16, 2008, the entire content of which is hereby incorporated by reference.

FIELD OF THE INVENTION

The invention relates to a method for calculating by optimization an optical system, for example and not limitedly the optical system represents an ophthalmic lens. More specifically, the invention relates to a method for determining parameters of an optical system implementing an optimization of criteria.

BACKGROUND OF THE INVENTION

Optimization methods for optical system calculation are well known; however, currently the number of criteria taken into account is limited and do not enable to answer all lens wearer needs. French patent FR 9812109 of the Applicant describes for example a method for determining optimal parameters for an optical system according especially to astigmatism and power criteria.

Known methods present drawbacks arising from the fact that classical criteria aim at improving only optical quality of the image caused by optical aberrations like power and astigmatism errors. These aberrations induce blurring in the image and a drop in contrast, causing therefore unclear vision.

Classical criteria do not enable to improve other kind of performance such as image deformations and localisation which are main issues for enhancing wearer adaptation and answering user specific needs in general.

SUMMARY OF THE INVENTION

The present invention makes it possible to consider a large number of criteria in order to achieve a better optical system calculation, closer to the user needs.

Thereby, one aspect of the invention is directed to a method for calculating by optimization an optical system for example an ophthalmic lens according to at least one criterion comprising the steps of:

i. Selecting at least one criterion among one or several of the three following criteria groups consisting of:
central vision criteria group consisting of: ocular deviation, object visual angular field in central vision, image visual angular field in central vision, or a variation of preceding criteria;
peripheral vision criteria group consisting of: pupil field ray deviation, object visual angular field in peripheral vision, image visual angular field in peripheral vision, prismatic deviation in peripheral vision, magnification in peripheral vision, or a variation of preceding criteria;
general criteria group consisting of: lens volume, magnification of the eye, temple shift;
ii. For each selected criterion, defining:
an evaluation zone comprising one or several evaluation domains and a set of target values associated to said evaluation domains, if said criterion belongs to the central or to the peripheral vision criteria groups, or
a target value associated to said criterion, if said criterion belongs to the general criteria group;
iii. Selecting a starting optical system and defining a working optical system to be equal to the starting optical system, where the starting optical system and the working optical system comprise each at least two optical surfaces;
iv. Evaluating for the working optical system and for each selected criterion:
a set of criterion values associated to said evaluation domains, if said selected criterion belongs to the central or peripheral vision criteria groups, or
a criterion value, if said criterion belongs to the general criteria group;
v. Modifying at least one parameter of the working optical system, in order to minimize a cost function considering target values and criterion values by repeating step iv till a stop criterion is satisfied.

The criteria disclosed herein enable the optical designer to better answer lens wearer needs. For example, image visual angular field in central vision is to be optimized according to specific needs and ametropia in order, for example, to limit space scrolling. Another advantage of the method is the possibility to optimize the object visual angular field in central vision in order to adapt the latter to the wearer or to the frame of its glasses; for example, thanks to the method, the optical designer will try to widen object visual angular field for wearers suffering from hypermetropia since hypermetropic wearers are always complaining of a narrow field of view.

The choice of here above mentioned criteria chosen among one or several of the criteria groups allow to manage shape deformations of the image and deviations (ocular and/or prismatic) whereas criteria commonly used to determine optical systems are directed to optical aberrations management.

Optical aberrations cause blurring the image and reduce contrast and/or cause unclear vision whereas shape deformations of the image and deviations (ocular and/or prismatic) modify the appearance of the object to be seen, and the image of the object to be seen may be smaller or bigger, twisted, delocalized compared to the actual object to be seen.

According to an embodiment, the method is implemented by technical means, as for example by computer means.

According to different embodiments, that can be combined, the at least one criterion selected among the criteria group is:
one or several central vision criteria,
one or several peripheral vision criteria,
one or several general criteria.

According to different embodiments that can be combined, the at least one selected criterion among the criteria groups is selected among one or a plurality of following sub-groups:
central vision criteria sub-group 1 consisting of ocular deviation, or a variation thereof;
central vision criteria sub-group 2 consisting of object visual angular field in central vision, image visual angular field in central vision or a variation thereof;
peripheral vision criteria sub-group 1 consisting of pupil field ray deviation, prismatic deviation in peripheral vision or a variation thereof;
peripheral vision criteria sub-group 2 consisting of object visual angular field in peripheral vision, image vision angular field in peripheral vision or a variation thereof;
peripheral vision criteria sub-group 3 consisting of magnification in peripheral vision or a variation thereof;
general criteria sub-group 1 consisting of lens volume or a variation thereof;

general criteria sub-group 2 consisting of magnification of the eye, temple shift or a variation thereof.

In the scope of the present invention, the aforementioned terms are understood according to the following definitions:

An optical system is defined by the coefficients of the equations of all its surfaces, the index of the glasses and the position of each surface relatively to each other (offset, rotation and tilt). These elements are referred as the parameters of the optical system. Surfaces of an optical system are usually represented according to a polynomial or parametric equation obtained by using a model based on the B-splines or Zernike polynomials. These models give continuous curvature on the whole lens. Surfaces can also be Fresnel or pixelized surfaces. The index of materials can be inhomogeneous and depend on some parameters of the optical system.

Central vision (also referred as foveal vision) describes the work of the fovea, a small area in the center of the retina that contains a rich collection of cones. In a central vision situation, an observer looks at an object which stays in a gaze direction and the fovea of the observer is moved to follow the object. Central vision permits a person to read, drive, and perform other activities that require fine and sharp vision.

A gaze direction is defined by two angles measured with regard to reference axes centered on the center of rotation of the eye.

Peripheral vision describes the ability to see objects and movement outside of the direct line of vision. In a peripheral vision situation, an observer looks in a fixed gaze direction and an object is seen out of this direct line of vision. The direction of a ray coming from the object to the eye is then different from the gaze direction and is referred as peripheral ray direction. Peripheral vision is the work of the rods, nerve cells located outside the fovea of the retina.

A peripheral ray direction is defined by two angles measured with regard to reference axes centered on the eye entrance pupil and moving along the gaze direction axis.

Ocular deviation is defined in central vision and describes the fact that adding a lens causes an eye to rotate in order to stay focused on the same object. The angle can be measured in prismatic diopters.

Object visual angular field in central vision is defined in the object space by the angular portion of space that the eye can observe scanning an angular portion of the lens determined by at least two gaze directions. For instance, these gaze directions can be defined by the shape of the spectacle frame or by an aberration level that hinders visualizing the object space with a good enough sharpness.

Image visual angular field in central vision in the image space (eye space) is defined for a determined and fixed object visual angular field in central vision in the object space, as the angular portion scanned by the eye to visualize the visual angular field in the object space.

Variation of a criterion evaluated thanks to an evaluation function in a particular gaze direction $(\alpha_1/\beta_1)$ according to a component of the gaze direction is understood as the derivative of the said evaluation function of the said criterion with respect to the said component. Considering a evaluation function $H_k$, one can consider the partial derivative of $H_k$ with respect to $\alpha$:

$$\frac{\partial H_k}{\partial \alpha}(\alpha_1, \beta_1).$$

One can consider the partial derivative of $H_k$ with respect to $\beta$:

$$\frac{\partial H_k}{\partial \beta}(\alpha_1, \beta_1).$$

Variation of a criteria can be evaluated as the composition of the partial derivatives of the evaluation function with respect to $\alpha$ and to $\beta$, as for example:

$$\sqrt{\left(\frac{\partial H_k}{\partial \alpha}(\alpha_1, \beta_1)\right)^2 + \left(\frac{\partial H_k}{\partial \beta}(\alpha_1, \beta_1)\right)^2}$$

Pupil field ray deviation describes that a ray coming from an object located in the peripheral field of view is modified by adding a lens on its path to the eye entrance pupil.

Object visual angular field in peripheral vision is defined in the object space. It is the angular portion of space that the eye can observe in the peripheral visual angular field of view (while the eye is looking in a fixed direction) defined by at least two rays issued from the center of eye entrance pupil. For instance, these rays can be defined by the shape of the spectacle frame or by an aberration level that hinders visualizing the object space with a good enough sharpness.

Image visual angular field in peripheral vision is defined for a determined and fixed peripheral object visual angular field as the corresponding angular portion in the image space viewed by the peripheral vision of the eye.

Prismatic deviation in peripheral vision is defined in the object space by the angular deviation of a ray issued from the center of the entrance pupil introduced by the quantity of prism of the lens.

Magnification in peripheral vision is defined as the ratio between the apparent angular size (or the solid angle) of an object seen in peripheral vision without lens and the apparent angular size (or the solid angle) of an object seen through the lens in peripheral vision.

Variation of a criterion evaluated thanks to an evaluation function in a particular ray direction $(\alpha'_1, \beta'_1)$ according to a component of the ray direction is understood as the derivative of the said evaluation function of the said criterion with respect to the said component. Considering a evaluation function $H_k$, one can consider the partial derivative of $H_k$ with respect to $\alpha'$:

$$\frac{\partial H_k}{\partial \alpha'}(\alpha'_1, \beta'_1).$$

One can consider the partial derivative of $H_k$ with respect to $\beta'$:

$$\frac{\partial H_k}{\partial \beta'}(\alpha'_1, \beta'_1).$$

Variation of a criteria can be evaluated as the composition of the partial derivatives of the evaluation function with respect to $\alpha'$ and to $\beta'$, as for example:

$$\sqrt{\left(\frac{\partial H_k}{\partial \alpha'}(\alpha'_1, \beta'_1)\right)^2 + \left(\frac{\partial H_k}{\partial \beta'}(\alpha'_1, \beta'_1)\right)^2}$$

Magnification of the eye is defined as the magnification of the eye of the wearer assessed by an observer.

Temple shift is defined as the offset of the wearer temple assessed by an observer.

Lens volume is the volume of the lens. It can be assessed through discretization of the lens, for example by a trapezium method or by a rectangle method.

An evaluation zone is associated with a criterion belonging to the central or peripheral vision criteria groups to be evaluated; it is composed of one or several evaluation domains. An evaluation domain is composed of one or several gaze directions for a criterion belonging to the central vision criteria group and of one or several peripheral ray directions for a criterion belonging to the peripheral vision criteria group.

A set is defined as one or several entities.

A target value is a value to be reached by a criterion. When the selected criterion belongs to the central or peripheral vision criteria groups, a target value is associated to an evaluation domain.

The starting optical system is defined as a set of initial parameters of the optical system to be optimized.

The working optical system is defined as a set of parameters representing an optical system. At the beginning of the optimization process, the working optical system parameters are equal to the parameters of the starting optical system. The working optical system parameters are then modified through the optimization process.

A stop criterion is used to identify the best iteration to stop the optimization algorithm. It can be for example a threshold on the cost function: $\|J(v)\| < \epsilon_1$ which indicates that the lens v is close enough to the solution. It can also be a criterion on the relative variation of the cost function between two iterations k and k+1: $\|J(v^{k+1}) - J(v^k)\| < \epsilon_2 \|J(v^k)\|$ which indicates a stagnation of the algorithm.

Criterion values can be evaluated considering the working optical system parameters. According to an embodiment, criteria are evaluated through ray tracing.

According to an embodiment, an evaluation function associates a criterion value to a criterion belonging to the criteria groups, an evaluation domain for criterion chosen among central and peripheral vision criterion groups, and an optical system.

The cost function provides a level of performance of the working optical system according to the target values and to the criterion values evaluated for the working optical system parameters.

In one embodiment the cost function is a sum over the selected criteria of:
  sums, over the evaluation domains, of differences between a criterion value associated to an evaluation domain and the target value associated to said evaluation domain to the power of two, for criteria belonging to the central vision and peripheral vision criteria groups, and
  differences between a criterion value and a target value to the power of two, for criteria belonging to the general criteria group.

In one embodiment the working optical system to be optimized comprises at least two optical surfaces and the parameter which is modified is at least the coefficient of the equation of one optical surface of the working optical system.

In one embodiment wherein a selected criterion belongs to the central vision criteria group, the associated evaluation domains comprise at least one gaze direction, said direction being considered with regard to reference axes associated with the eye rotation center and being used to perform ray tracing from the eye rotation center for the criterion evaluation.

In one embodiment wherein a selected criterion belongs to peripheral vision criteria group, the associated evaluation domains comprise of at least one peripheral ray direction, said direction being considered with regard to reference axes associated with the entrance pupil center moving along a determined gaze direction and being used to perform ray tracing from the entrance pupil center for the criterion evaluation.

In one embodiment wherein a selected criterion belongs to any of: ocular deviation, pupil field ray deviation, prismatic deviation in peripheral vision, magnification in peripheral vision, the associated evaluation domains consist in one direction.

This direction refers to a peripheral ray direction for a criterion belonging to the peripheral criteria group and to a gaze direction for a criterion belonging to the central vision criteria group.

In one embodiment wherein a selected criterion belongs to any of object visual angular field in central vision, image visual angular field in central vision, object visual angular field in peripheral vision and image visual angular field in peripheral vision, the associated evaluation domains comprise of at least two directions.

In one embodiment the selected criterion is defined either by a variation of a criterion belonging to the central vision criteria group or by a variation of a criterion belonging to the peripheral vision criteria group.

In one embodiment, the working optical system to be optimized comprises at least two optical surfaces and the parameters which are modified are at least the coefficients of the equations of two optical surfaces of the working optical system.

It is generally difficult to optimize a lens considering a lot of criteria which are from different natures if only the equation of one surface is considered as variable. This embodiment enables optical designers to take into account a larger number of criteria in the optimization process and is paving the way for optical system geometrical performance enhancement and better answer to physiological needs of lens wearers. The benefit for the wearer is improved when several surfaces of the optical system are simultaneously optimized.

In one embodiment wherein the optical system to be optimized comprises at least two optical surfaces, the modification of the working optical system is operated in modifying at least the index of the working optical system. It is possible to make a lens from some inhomogeneous material, one where there is a Gradient in the Index of refraction (known as GRIN lens). For example, the distribution of the index which is optimized can be axial or radial and/or can depend on the wavelength.

In one embodiment, the method for calculating an optical system further comprises astigmatism criterion in central vision and/or power criterion in central vision. Power criterion in central vision means that the power prescribed to the wearer is taken into account. During the optimization, parameters of the optical system are calculated in order to minimize power errors for each gaze direction.

Astigmatism criterion in central vision means that during the optimization, parameters of the optical system are calculated in order to minimize the difference between astigmatism prescribed to the wearer and astigmatism generated by the working optical system both as regards amplitude and the axis thereof in the reference axes associated to the CRE and for each gaze direction, this difference being called residual astigmatism. The French patent FR 9812109 of the Applicant describes how to take into account such classical criteria during an optical system optimization method.

In one embodiment, the optical system is a progressive addition lens and the method for calculating an optical system further comprises add power criterion in central vision.

In one embodiment, the cost function J is mathematically expressed according to:

$$J(v) = \sum_{k=1}^{N1} \sum_{i=1}^{Mk} w_k^i * (H_k(D_k^i, v) - T_k^i)^2 + \sum_{k=1}^{N2} w'_k * (H'_k(v) - T'_k)^2,$$

wherein:
k and i are integer variables,
$N_1$ is an integer superior or equal to 1 and represents the number of selected criteria belonging to the central vision and peripheral vision criteria groups;
$N_2$ is an integer superior or equal to 1 and represents the number of selected criteria belonging to the general criteria group;
$M_k$ is an integer superior or equal to 1 and represents the number of evaluation domains for a criterion belonging to the central vision or peripheral vision criteria groups of index k;
v defines the working optical system parameters;
$w^i_k$ are the weights associated to a criterion belonging to the central vision or peripheral vision criteria groups of index k and to an associated evaluation domain of index i;
$w'_k$ is the weight associated to a criterion belonging to the general criteria group of index k
$D^i_k$ is an evaluation domain of index i of an evaluation zone associated to a criterion belonging to the central vision or peripheral vision criteria groups of index k;
$H_k$ is an evaluation function which associates a criterion value to a criterion belonging to the central vision or peripheral vision criteria groups of index k, an evaluation domain $D^i_k$ and a optical system defined by its parameters v;
$H'_k$ is an evaluation function which associates a criterion value to a criterion belonging to the general criteria group of index k and a optical system defined by its parameters v;
$T^i_k$ is a target value of index i of the set of target values associated to an evaluation domain $D^i_k$ of a criterion belonging to the central vision or peripheral vision criteria groups of index k;
$T'_k$ is the target value associated to a criterion belonging to the general criteria group of index k.

In one embodiment, the invention also relates to a method of manufacturing a lens according to an optical system, the method comprising the steps of:
- calculating by optimization the optical system according to the method described hereinabove,
- surface machining of at least one optical surface according to said optical system.

When both surfaces of a lens are optimized during the process, the manufacturing method relates to surface machining both surfaces.

Another aspect of the invention relates to a computer program product comprising one or more stored sequences of instructions that is accessible to a processor and which, when executed by the processor, causes the processor to carry out the steps of the different embodiments of the preceding methods.

Another aspect of the invention relates to a computer-readable medium carrying one or more sequences of instructions of the preceding computer program product.

Unless specifically stated otherwise, as apparent from the following discussions, it is appreciated that throughout the specification discussions utilizing terms such as "evaluating", "computing", "calculating" "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Non limited embodiments of the invention will now be described with reference to the accompanying drawing wherein FIGS. 1 to 12 describe examples of criteria evaluation according to embodiments of the present invention. Those figures describe non limiting examples, same reference on different figures refer to the same object.

DESCRIPTION OF PREFERRED EMBODIMENTS

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

We focus first on the criterion evaluation method according to the vision situation (central or peripheral). In order to compute a criterion, ray tracing software can be used. Ray tracing has special features according to the model of the lens-plus-eye system.

Figure 1:
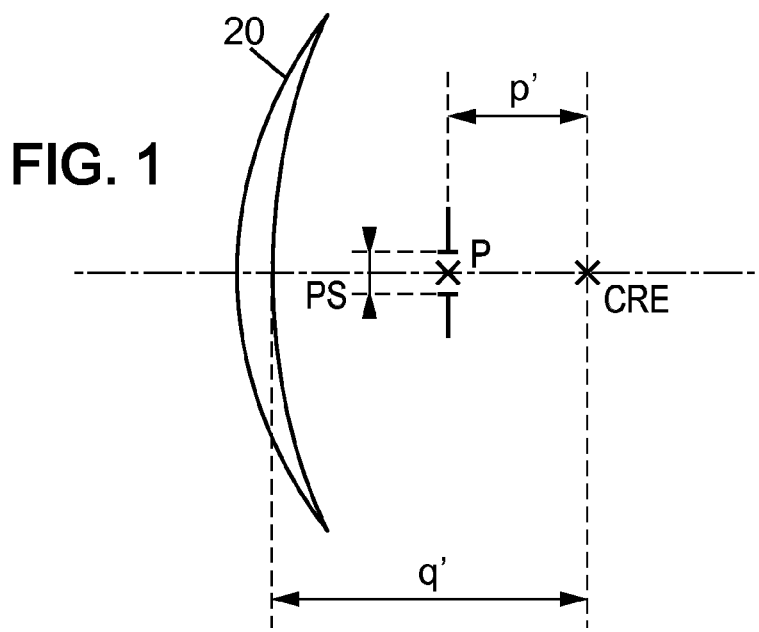
FIG. 1 shows a schematic view of a lens plus eye system.

FIG. 1 illustrates a schematic view of a lens-plus-eye system. Referring to FIG. 1, an eye position can be defined by the center of rotation of the eye CRE and the entrance pupil central point P. PS is the pupil size (not drawn to scale). The distance q' between the CRE and the lens 20 is generally, but not limited to, set to 25.5 mm, and p' defines the position of the eye entrance pupil with respect to the CRE.

Figure 2:
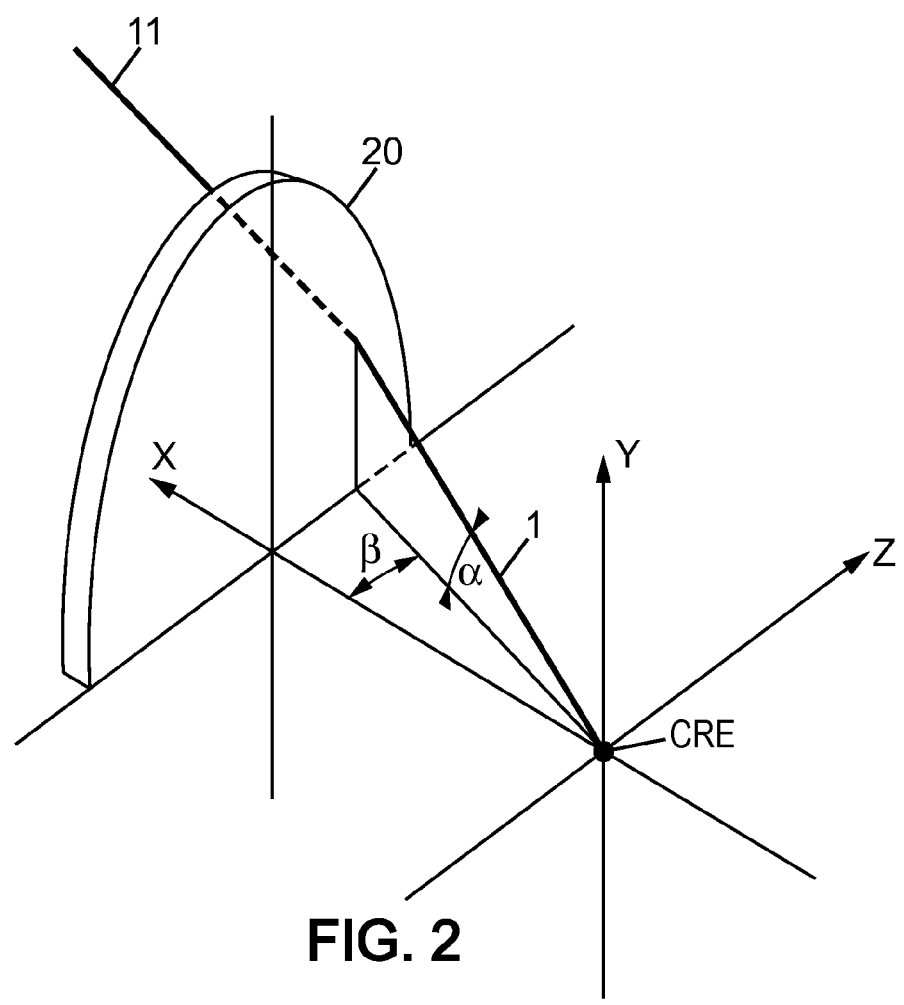
FIG. 2 shows a ray tracing from the center of rotation of the eye.

FIG. 2 illustrates a model for central vision in the purpose of assessing a criterion in a central vision situation by ray tracing. In a central vision situation, the eye rotates about its center of rotation as well as the entrance pupil of the eye. A gaze direction is defined by two angles $(\alpha,\beta)$ measured with regard to reference axes R=(X,Y,Z) centered on the CRE. For assessing a central vision criterion in a gaze direction $(\alpha,\beta)$, a gaze ray 1 is built from the CRE in the gaze direction $(\alpha,\beta)$. 11 is the incident ray after passing through the lens 20.

Figure 3:
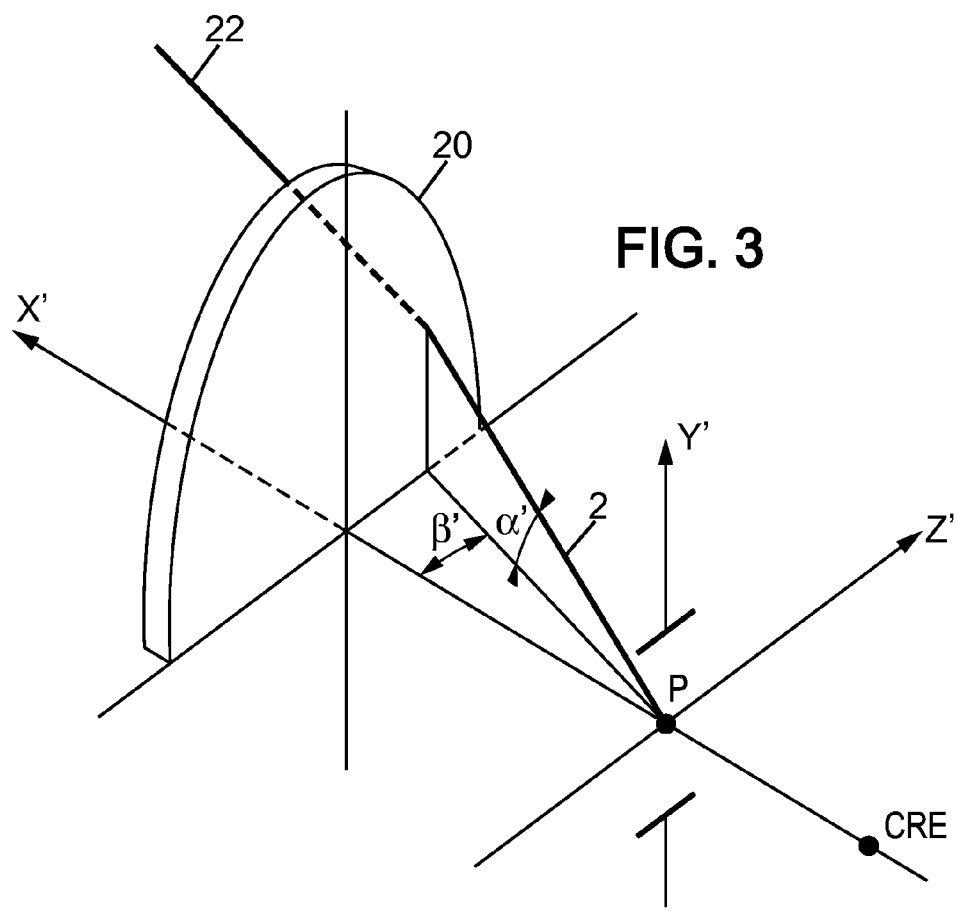
FIG. 3 shows a ray tracing from the center of the eye entrance pupil.

FIG. 3 illustrates a model for peripheral vision in the purpose of assessing a criterion in a peripheral vision situation through ray tracing. In a peripheral vision situation, a gaze direction $(\alpha,\beta)$ (not represented here) is fixed, and an object is viewed in a peripheral ray direction different from the gaze direction. A peripheral ray direction is defined by two angles $(\alpha',\beta')$ measured with regard to reference axes R'=(X',Y',Z') centered on the eye entrance pupil and moving along the gaze direction axis given by the fixed direction $(\alpha,\beta)$ and represented by axis X' on FIG. 3. For assessing a peripheral vision criterion in a peripheral ray direction $(\alpha',\beta3')$, a peripheral ray 2 is built from the center of the pupil P in a peripheral ray direction $(\alpha',\beta')$. 22 is the incident ray after passing through the lens 20.

According to the gaze ray 1 (in central vision) or to the peripheral ray 2 (in peripheral vision), the ray-tracing software computes the corresponding incident ray, alternatively under reference 11 and 22 on FIGS. 2 and 3. Then, an object point is chosen on the ray in the object space and from this object a pencil of rays is built to calculate the final image. Ray tracing enables then to compute the selected criteria.

FIGS. 4 to 12 are now illustrating the criterion evaluation method of criteria according to the present invention.

Figure 4:
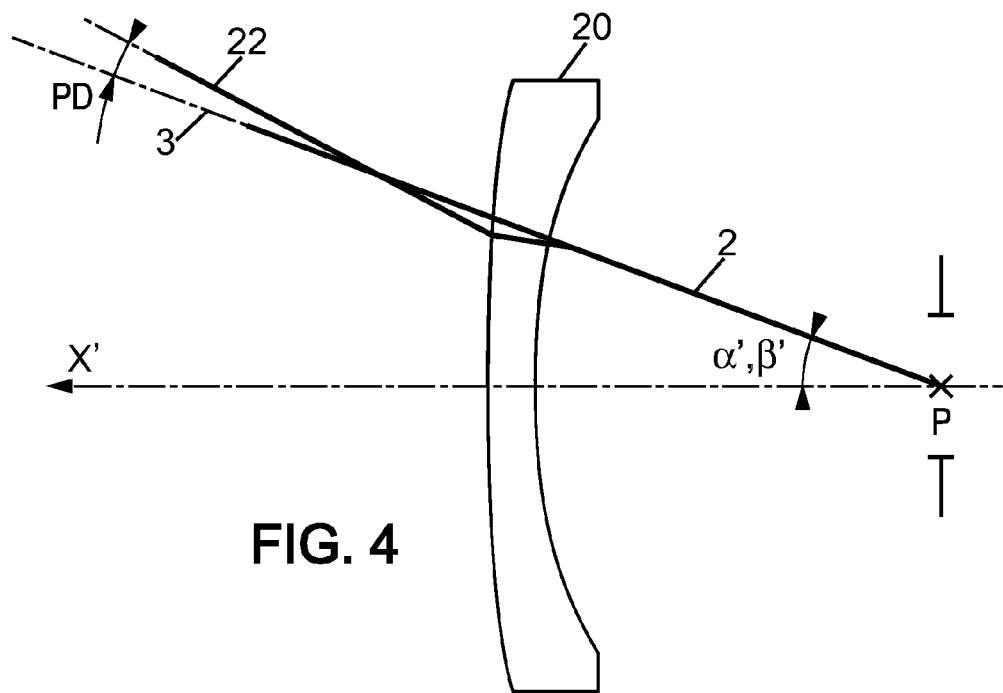
FIG. 4 illustrates prismatic deviation in peripheral vision.

FIG. 4 illustrates ray tracing for estimating prismatic deviation PD in peripheral vision. Prismatic deviation in peripheral vision is estimated through ray tracing of a peripheral ray associated to a peripheral ray direction $(\alpha',\beta')$ given with regard to reference axes centered on the center of the entrance pupil and moving along the gaze direction, as discussed hereinabove. A ray 2 issued from the center of the entrance pupil in peripheral ray direction $(\alpha',\beta')$ with the gaze direction axis X' is traced. Incident ray 22 corresponding to ray 2 is then built. Prismatic deviation represents the angle between incident ray 22 and a virtual ray 3 issued from the center of the pupil in the direction of ray 2 and not deviated by the prism of lens 20.

Figure 5:
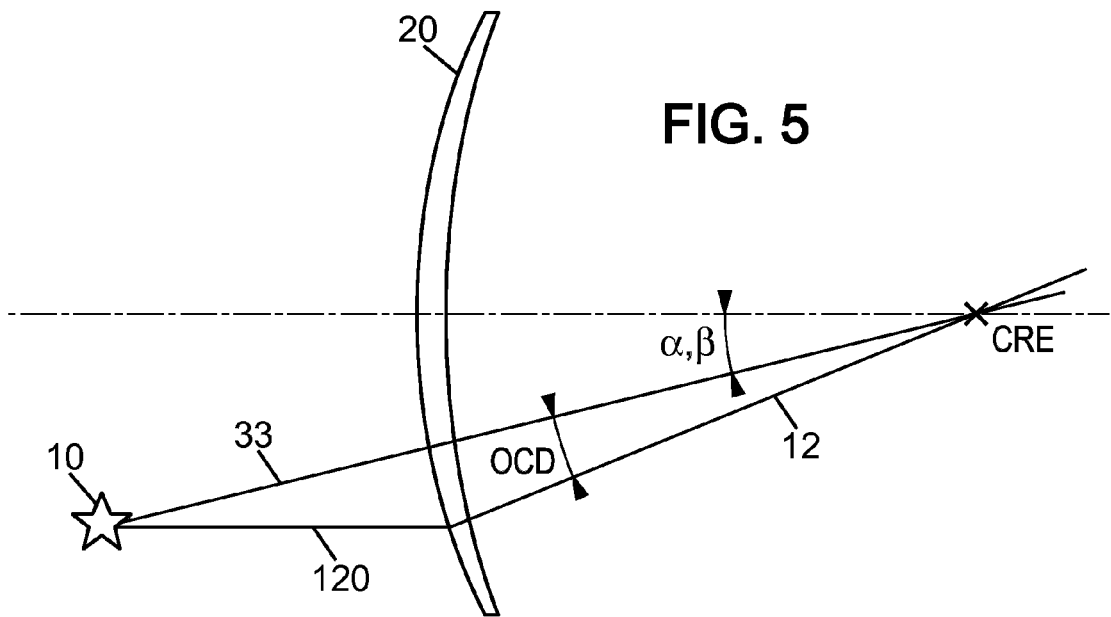
FIG. 5 illustrates ocular deviation.

FIG. 5 describes ocular deviation OCD. It shows a first ray 33 coming from an object 10 when no lens is placed in its path to the CRE, and a second ray 120 coming from the same object whose path is modified by the addition of a lens 20. Ray 12 corresponds to ray 120 in the image space after passing through the lens 20. The ocular deviation OCD in a direction $(\alpha,\beta)$ is estimated in central vision and is defined as the angle between:

the direction of the eye targeting an object without lens (represented by ray 33) and the direction of the eye targeting the same object when said lens is placed in front of the viewer eyes (represented by ray 12).

As an example, an evaluation function is programmed to evaluate the criterion OCD.

$$|OCD| = |H(D,v)| = \text{Arcsin}\left(\frac{\|V_{ini} \wedge V_{fin}\|}{\|V_{ini}\| \cdot \|V_{fin}\|}\right)$$

where $V_{ini}$ and $V_{fin}$ are direction vectors of alternatively ray 33 and ray 12.

The evaluation domain is composed of two gaze directions $D=\{(\alpha i,\beta i), i=1,2\}$ $(\alpha 1,\beta 1)$ corresponding to ray 33, and $(\alpha 2,\beta 2)$ corresponding to ray 12.

Figure 6:
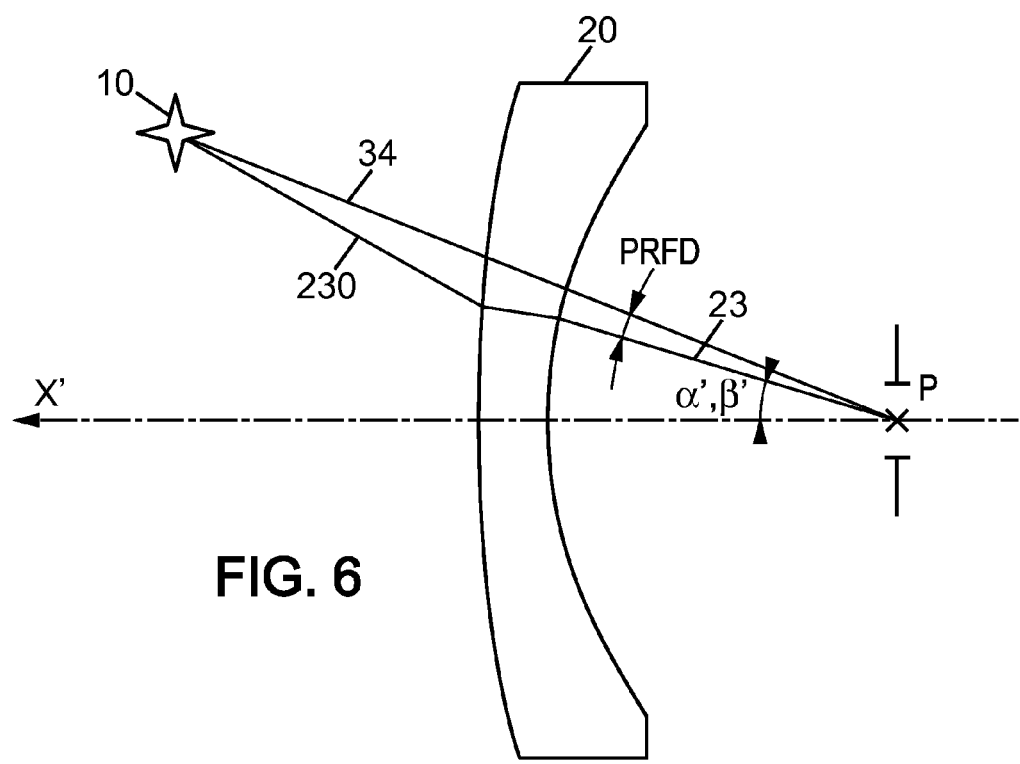
FIG. 6 illustrates pupil ray field deviation.

FIG. 6 illustrates pupil ray field deviation PRFD, it shows a first ray 34 coming from an object 10 located in the peripheral field of view when no lens is placed in its path to the eye entrance pupil, and a second incident ray 230 coming from the same object whose path is modified by the introduction of a lens 20. Ray 23 corresponds in the image field to incident ray 230.

Pupil field ray deviation PRFD is estimated in peripheral vision and is defined as the angle, measured in the image space, between a straight ray 34 coming from an object localised in the peripheral field of view of an eye and entering the center of the pupil, and a ray 23 coming from the same object and entering the center of the pupil when said lens is placed on the eyes of the wearer.

As an example, an evaluation function is programmed to evaluate the criterion PRFD.

$$PRFD = H(D,v) = \text{Arcsin}\left(\frac{\|V_{ini} \wedge V_{fin}\|}{\|V_{ini}\| \cdot \|V_{fin}\|}\right)$$

where $V_{ini}$ and $V_{fin}$ are direction vectors of respectively ray 34 and ray 23.

The evaluation domain is composed of two gaze directions $D=\{(\alpha i,\beta i), i=1,2\}$ $(\alpha 1,\beta 1)$ corresponding to ray 34, and $(\alpha 2,\beta 2)$ corresponding to ray 23.

Figure 7:
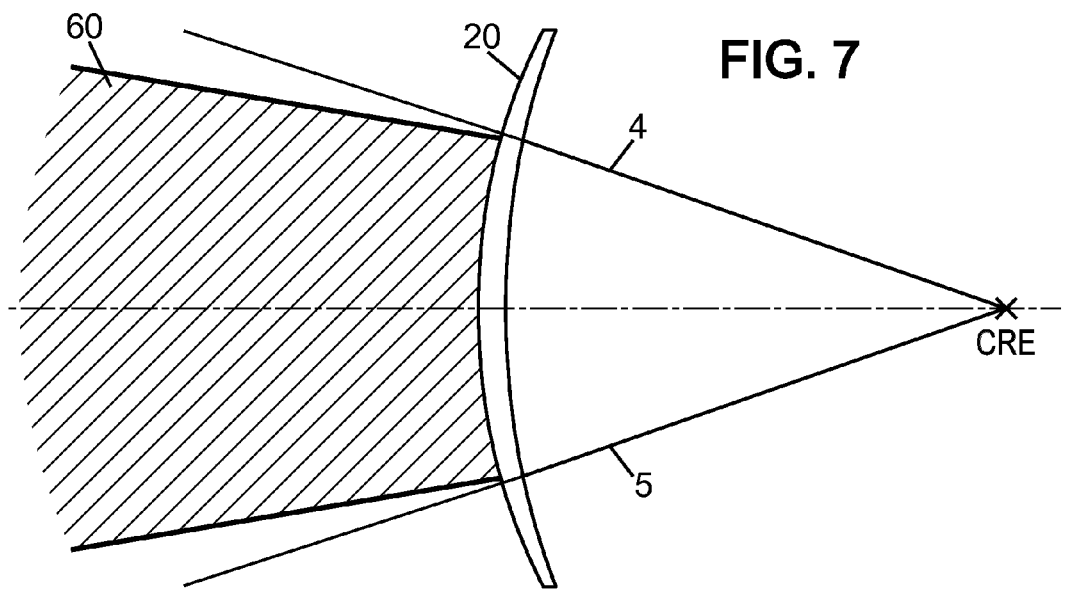
FIG. 7 illustrates object visual angular field in central vision.

FIG. 7 illustrates object visual angular field in central vision in a plane and for two arbitrarily chosen rays 4 and 5 issued from the CRE. The object visual angular field represents the angular portion of space that the eye can observe scanning an angular portion of the lens determined by ray 4 and ray 5 in the object space. The hatched part 60 represents the object visual angular field in central vision.

Figure 8:
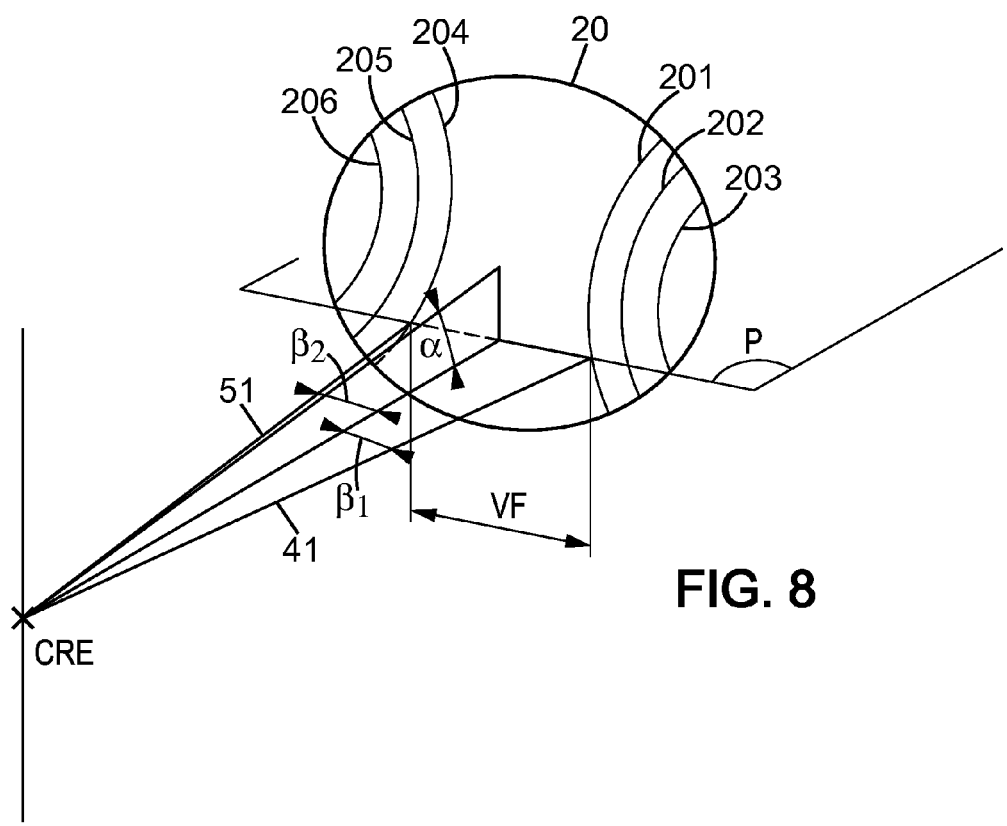
FIG. 8 illustrates horizontal object visual angular field.

FIG. 8 illustrates an example of visual angular field VF in central vision for two rays 41 and 51 issued from the CRE. The lens 20 is represented as a surface with isoastigmatism lines 201-206. Rays 41 and 51 are defined as the intersection between a predetermined horizontal axis given by a direction α and two predetermined isoastigmatism lines 201 and 204. These intersections enable to trace ray 41 along direction (α, β1) and ray 51 along direction (α,β2). The object visual angular field VF in central vision is a function of prismatic deviation and can be mathematically expressed for two rays as:

$$VF(\alpha)=|\beta1+Dp\_H(\alpha,\beta1)|+|\beta2+Dp\_H(\alpha,\beta2)|$$

Dp_H(α,β1) represents horizontal prismatic deviation in the gaze direction (α,β1). Horizontal prismatic deviation is the component of the prismatic deviation in an horizontal plane referenced P on FIG. 8.

Dp_H(α,β2) represents horizontal prismatic deviation in the gaze direction (α,β2).

D={(α,β1),(α,β2)} is an evaluation domain. An evaluation function associated with the criterion visual angular field is given by H(D,v)=VF(α) for given optical system parameters v.

Figure 9:
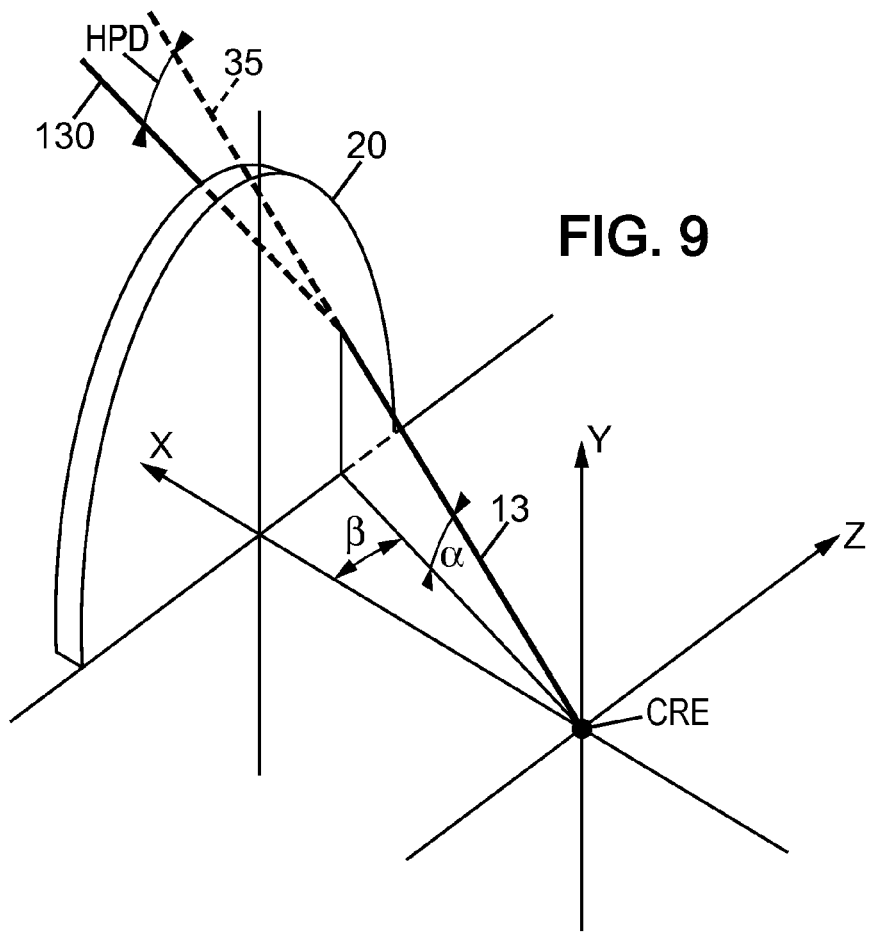
FIG. 9 illustrates horizontal prismatic deviation in central vision.

FIG. 9 illustrates horizontal prismatic deviation HPD in central vision. Prismatic deviation is defined as the angular difference between ray 130 and ray 35. Ray 130 is the image of the ray 13 in the object space. Ray 13 is issued from the eye rotation center according to direction (α,β) in the fixed reference axes (X,Y,Z) centered on the eye rotation center as represented on FIG. 9. Ray 35 is a virtual ray issued from the eye rotation center according to direction (α,β) and not deviated by the prism of the lens. Horizontal prismatic deviation HPD is the component of the prismatic deviation in the plane (XOZ) and can be calculated through:

$$HPD = \left(\text{Arcsin}\left(\left(\frac{V_{ini}^h \wedge V_{fin}^h}{\|V_{ini}^h\|\|V_{fin}^h\|}\right) \cdot \vec{y}\right)\right),$$

wherein $\vec{V}^h=\vec{V}-\vec{y}(\vec{V}\cdot\vec{y})$, and $V_{ini}$ and $V_{fin}$ are direction vectors of alternatively ray 13 and 130.

An evaluation domain is composed of one gaze direction D={(α,β)}, (α, β) corresponding to ray 13 and an evaluation function is given by H(D,v)=HPD.

Figure 10:
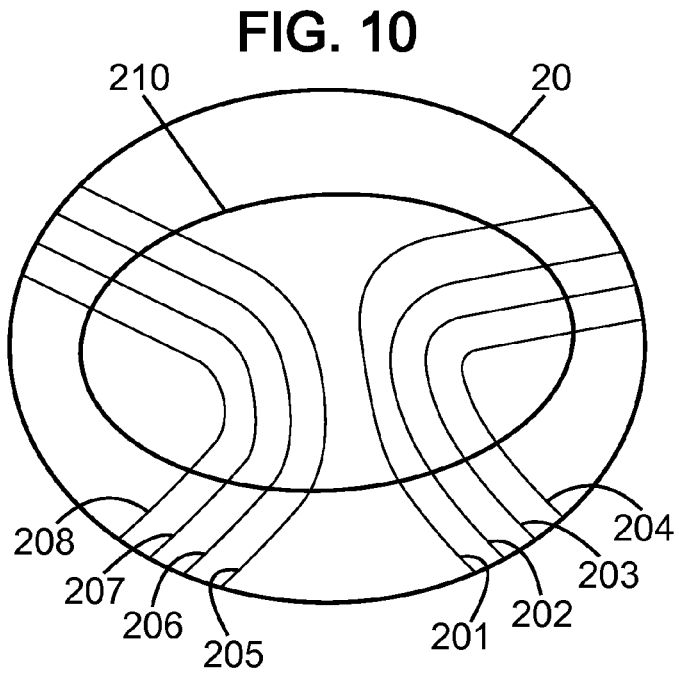
FIG. 10 illustrates total object visual angular field.

FIG. 10 illustrates another embodiment of object visual angular field in central vision defined by a set of gaze directions representing the spectacle frame shape 210. The lens 20 is represented as a surface with isoastigmatism lines 201-208. For each (αi,βi) of said gaze directions, we define Pi the plane containing:

the vector defined by the gaze direction (αi,βi)
the vector defined by the gaze direction (0,0)
the Centre of Rotation of the Eye We calculate the prismatic deviation projected on Pi for the gaze direction given by (α,β)=(0,0): Dp_i(0,0).
We calculate the prismatic deviation projected on Pi for the gaze direction given by (αi,βi):Dp_i(αi,βi).
This visual angular field is named total object visual angular field and can be mathematically expressed as $$VF = \sum_i |Dp\_i(0, 0) + \beta i + Dp\_i(\alpha i, \beta i)|$$

Figure 11:
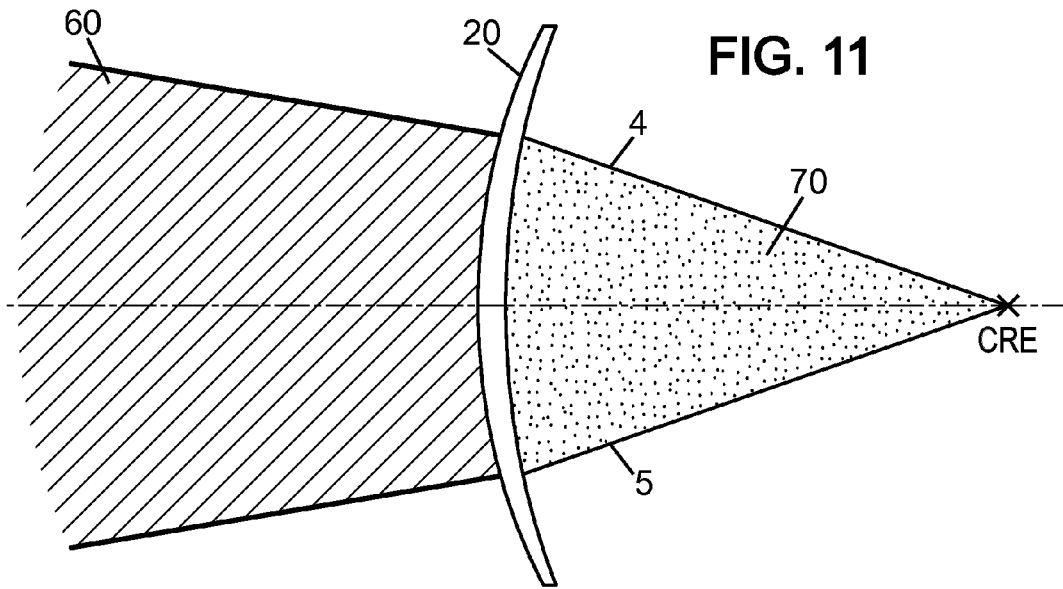
FIG. 11 illustrates image visual angular field in central vision.

Where:
Dp_i(αi,βi) represents the prismatic deviation in the gaze direction (αi,βi) projected on the plane Pi.
Let D be the evaluation domain composed by the said gaze directions D={(αi,βi)}. An evaluation function associated to the criterion object visual angular field and the evaluation domain D1 is given by H(D1,v)=VF FIG. 11 illustrates image visual angular field in central vision, rays 4 and 5 are used to define the object visual angular field in central vision and dotted part 70 represents the image visual angular field in central vision considering an object visual angular field in central vision represented in hatched part 60.

Figure 12:
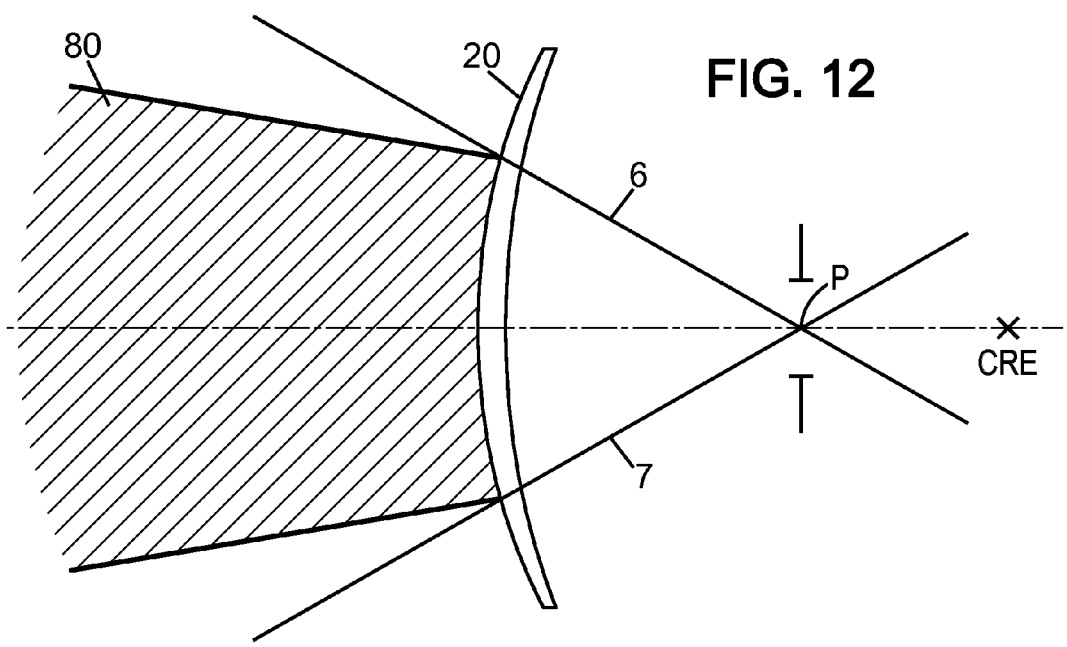
FIG. 12 illustrates object visual angular field in peripheral vision.

FIG. 12 illustrates object visual angular field in peripheral vision in a plane and for two arbitrarily chosen rays 6 and 7 issued from the entrance pupil of the eye P. The hatched part 80 represents the object visual angular field in peripheral vision.

Figure 13:
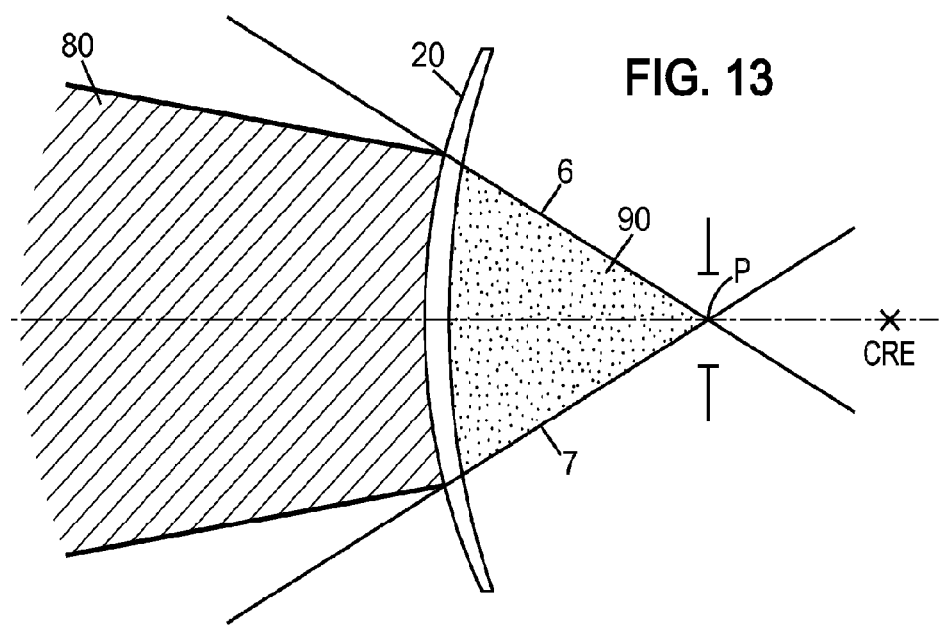
FIG. 13 illustrates image visual angular field in peripheral vision.

FIG. 13 illustrates image visual angular field in peripheral vision, rays 6 and 7 are used to define the object visual angular field in peripheral vision 80 and dotted part 90 represents the image visual angular field in peripheral vision considering an object visual angular field in peripheral vision represented in hatched part 80.

Figure 14:
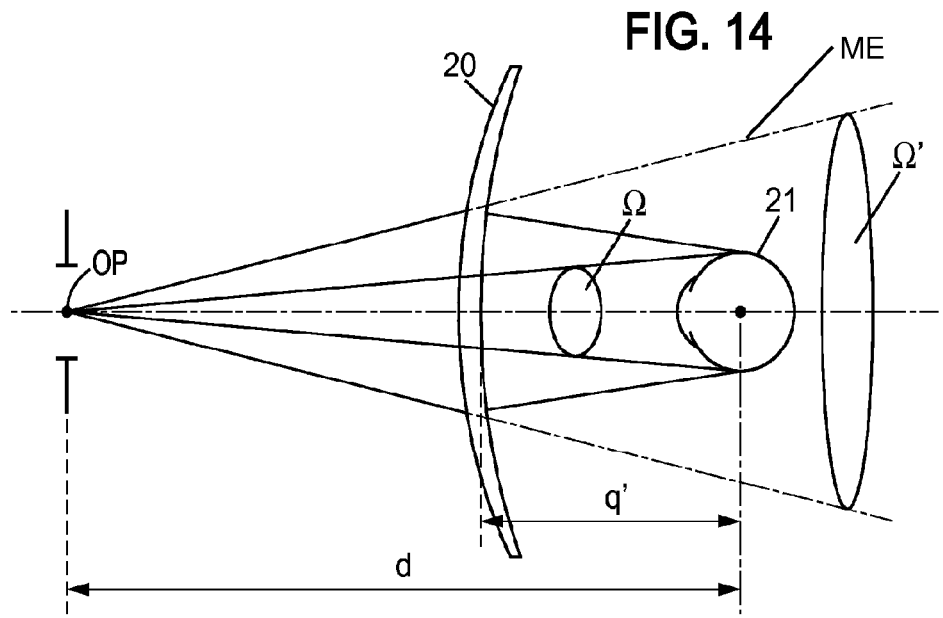
FIG. 14 illustrates the magnification of the eye in an embodiment of the invention.

FIG. 14 illustrates the magnification of the eye ME of a wearer. Ω and Ω' are alternately the solid angles under which an observer sees the eye of a wearer with and without a lens 20. The observer is located at a distance d of the wearer which eye is referred as 21, the center of the observer entrance pupil is referred as OP and the vertex distance between the wearer's eye 21 and the lens 20 is referred as q'. For example, the distance d can be equal to one meter.

This criterion can be mathematically expressed as $$ME = \frac{\Omega}{\Omega'}.$$

An evaluation function can be the mean value of ME criteria values calculated for n positions of the observer:

$$H(v) = \frac{1}{n}\sum_{i=1}^{n}\frac{\Omega_i}{\Omega_i'}.$$

Figure 15A:
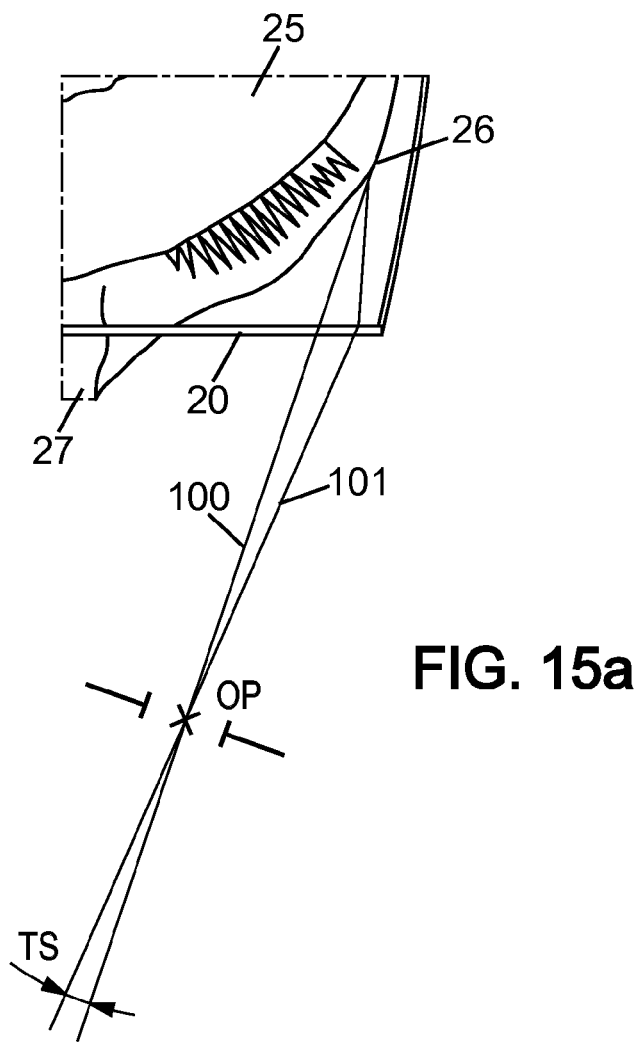
FIG. 15 a and b illustrate temple shift in an embodiment of the present invention.
Figure 15B:
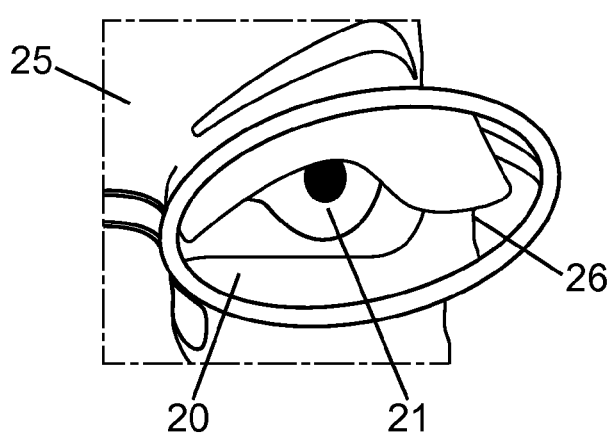

FIGS. 15 *a* and *b* illustrate temple shift TS.

Temple shift is due to the prismatic deviation induced by a lens 20 when a wearer is seen by an observer. OP is the pupil center point of an observer looking the wearer's head 25. The wearer's eye is referred as 21, the wearer's nose is referred as 27, the wearer's temple is referred as 26. The wearer is wearing spectacle lenses. Temple shift is defined as an angle TS between a ray 100 stemmed from the temple 26 when the observer is looking the temple of the wearer without the lens and a ray 101 stemmed from the temple 26 when the observer is looking the temple of the wearer through the lens 20. For example, the distance between the wearer and the observer can be equal to one meter.

Non limiting embodiments of the cost function are now described.

We now refer to an embodiment of the invention in which the selected criteria belong to the central and peripheral criteria groups and the cost function can be defined as a sum, over a set of selected criteria ($C_1, \ldots C_{N1}$), of each selected criterion cost function.

For a selected criterion $C_k$ ($k \in [1 \ldots N_1]$, $N_1$ integer superior or equal to 1), in order to define a criterion cost function, we further develop the expression of the criterion values.

An evaluation zone $D_k$ is associated to a criterion $C_k$. The evaluation zone comprises one or several evaluation domain $D^i_k$, ($i \in [1 \ldots M_k]$, $M_k$ integer superior or equal to 1 represents the number of evaluation domains associated to a criterion, said evaluation domain being defined as at least one gaze direction $(\alpha, \beta)$ if said criterion belongs to the central vision criteria group, or at least one peripheral ray direction $(\alpha', \beta')$ if said criterion belongs to the peripheral vision criteria group.

For a criterion $C_k$ and an evaluation zone $D_k$, an evaluation function $H_k$ associates to one evaluation domain $D^i_k$ of $D_k$ a criterion value $H_k(D^i_k, v)$ for a lens defined by its parameters v. Several evaluation functions are defined in the present document to evaluate directly some criteria but it has to be understood that an evaluation function can be more complex. As a first example, the evaluation function can be a mean or a sum of criterion values over an evaluation domain for criteria belonging to central and peripheral vision criteria groups. Another example of a complex evaluation function is also given for criteria belonging to the general criteria group in the FIG. 14.

Target values are also associated to the evaluation domains. Target values are determined by the optical designer by several ways:
- By using a "target lens": for a selected criterion, target values are computed from the target lens and are further used as target values.
- By using a database where target values are predetermined for a criterion and a corresponding set of evaluation domains.
- By using an analytic function.

Given criterion values and corresponding set of targets, the criterion cost function can be mathematically defined by:

$$J_k(v) = \sum_{i=1}^{Mk} w^j_k * (H_k(D^j_k, v) - T^j_k)^2,$$

wherein $T^i_k$ is a target value associated to an evaluation domain $D^i_k$ and $w^i_k$ are predetermined weights.

One can note that criteria related to visual angular field are computed from at least two directions (peripheral or gaze). For those criteria an evaluation domain $D^i_k$ is composed of several directions (peripheral ray directions for a visual angular field in peripheral vision or gaze directions for a visual angular field in central vision).

Then, the cost function can be mathematically expressed by:

$$J(v) = \sum_{k=1}^{M} J_k(v)$$

In one embodiment previous selected criteria ($C_1, \ldots C_{N1}$) further comprise ($C'_1, C'_{N2}$) criteria belonging to the general criteria group.

For a criterion $C'_k$ ($k \in [1 \ldots N_2]$, $N_2$, $N_2$ integer superior or equal to 1) belonging to $(C'_1, \ldots C'_{N2})$, $H'_k$ associates a single criterion value to an optical system of parameters v. The mathematical expression of a criterion cost function for a criterion belonging to the general criteria group is then:

$$J'_k(v) = w'_k * (H'_k(v) - T'_k)^2,$$

wherein $T'_k$ is the target value associated to $C'_k$ and $w'_k$ is a predetermined weight.

The cost function relating to all the selected criteria can then be expressed by:

$$J(v) = \sum_{k=1}^{M} J_k(v) + \sum_{k=1}^{N2} J'_k(v)$$

According to a non limiting example of the present invention, steps of the method for calculating an optical system are illustrated.

In our example, an optical designer aims at increasing the near vision object visual angular field of a progressive lens adapted to a specific prescription (hypermetrope +4 and presbyope +2) without changing the distributions of astigmatism and power of the lens.

The optical designer operates according to the method comprising the following steps:

(i) Choice of Criteria:
The selected criteria are power in central vision ($C_1$), astigmatism in central vision ($C_2$) and object visual angular field in central vision ($C_3$).

(ii) Definition of the Evaluation Domains and corresponding sets of target values:
For power and astigmatism, each evaluation domain is composed of one gaze direction. All the directions $(\alpha_i, \beta_j)$ enabling to trace a ray entering the lens are considered: $D_1 = D_2 = \{(\alpha_i, \beta_j), i \in [1 \ldots m]\}$. The evaluation zones comprise n*m evaluation domains. The associated set of target values are $T_1 = (T^{i,j}_1)$ and $T_2 = (T^{i,j}_2)$.

For object visual angular field, the evaluation zone consists of one evaluation domain that is composed of two gaze directions: $D_3 = \{[(\alpha, \beta_1), (\alpha, \beta_2)]\}$, wherein $\alpha = 31°$ corresponds to a value chosen for the near vision angular field, $\beta_1 = -5°$ and $\beta_2 = \beta 13°$ being determined according to a chosen isoastigmatism line and in the direction $\alpha$. The associated set of target value $T_3$ consists of one value $T_3 = 14°$ is chosen.

(iii) Choice of an Initial Lens:
An initial lens $v_{ini}$ is then determined by its parameters (coefficients of the equations of all its surfaces, index of the glasses and position of each surface relatively to each other). This lens is chosen to fit with the astigmatism and power distribution prescribed. The index of the glass is 1.5, its base curve is equal to 7 and the addition on the front surface is 2 diopters.

(iv) Evaluation of the Cost Function:
Each criterion cost function is computed according to the corresponding set of evaluation domains and targets for said lens parameters $V_{ini}$.

$$J_1(v_{ini}) = \sum_{i,j} (H_1(D^{i,j}_1, v_{ini}) - T^{i,j}_1)^2$$

$$J_2(v_{ini}) = \sum_{i,j} (H_2(D^{i,j}_2, v_{ini}) - T^{i,j}_2)^2$$

-continued $$J_3(v_{ini}) = (H_3(D_3, v_{ini}) - T_3)^2$$
$$= (|\beta 1 + Dp\_H(\alpha, \beta 1)| + |\beta 2 + Dp\_H(\alpha, \beta 2)| - T_3)^2$$

where $H_1(D^{i,j}_1, v_{ini})$ is the criterion value evaluated for the particular gaze direction $D^{i,j}_1 = (\alpha_i, \beta_j)$ with the evaluation function $H_1$ which is the classical power function.

$H_2(D^{i,j}_2, v_{ini})$ is the criterion value evaluated for the particular gaze direction $D^{i,j}_2 = (\alpha_i, \beta_j)$ with the evaluation function $H_2$ which is the classical astigmatism function.

According to a predetermined set of weights (for example: $w_1=1, w_2=1, w_3=2$), the cost function is then computed:

$$J(v_{ini}) = J_1(v_{ini}) + J_2(v_{ini}) + 2 \cdot J_3(v_{ini})$$

(v) Optimization:

The parameters of the lens are then modified in order to minimize the cost function.

The optimization leads to a lens $v_f$ whose cost function satisfies the convergence criterion. The lens $v_f$ has exactly the same distribution of astigmatism and power as the lens $v_{ini}$. However, the object visual angular field obtained for $v_f$ is equal to 14'.

It is clear that the preceding steps do not have mandatory to be implemented according to the order described hereinabove. It is possible to employ other methods of optimization, and other ways of representing surfaces differing from the method proposed.

The invention has been described above with the aid of embodiments without limitation of the general inventive concept. In particular the present invention provides a method for calculating by optimization an optical system, the optical system being all kinds of optical lenses, particularly ophthalmic lenses, e.g. single vision (spherical, torical), bi-focal, progressive, aspherical lenses (etc).

The invention claimed is:

1. A method for manufacturing an optical system comprising the steps of:
  i. selecting at least one criterion from among the groups consisting of:
    a central vision criteria group consisting of: ocular deviation, object visual angular field in central vision, image visual angular field in central vision, and a variation of preceding criteria;
    a peripheral vision criteria group consisting of: pupil field ray deviation, object visual angular field in peripheral vision, image visual angular field in peripheral vision, prismatic deviation in peripheral vision, magnification in peripheral vision, and a variation of preceding criteria; and
    a general criteria group consisting of: lens volume, magnification of the eyes, and temple shift;
  ii. for each criterion selected in step i.), defining:
    an evaluation zone comprising one or several evaluation domains and a set of target values associated with said evaluation domains, if said criterion selected in step i.) belongs to the central or to the peripheral vision criteria groups, or
    a target value associated with said criterion selected in step i.), if said criterion belongs to the general criteria group;
  iii. selecting a starting optical system and defining a working optical system to be equal to the starting optical system, wherein the starting optical system and the working optical system are each defined by coefficients of equations of its surfaces, an index of glasses thereof, and positions of each surface relative to each other, and wherein each optical system comprises at least two optical surfaces of a same lens;
  iv. evaluating for the working optical system and for each criterion selected in step i.):
    a set of criterion values associated with said evaluation domains selected in step ii.), if said criterion selected in step i.) belongs to the central or peripheral vision criteria groups, or
    a criterion value, if said criterion selected in step i.) belongs to the general criteria group;
  v. modifying at least coefficients of equations of the at least two optical surfaces of the working optical system to minimize a cost function considering target values and criterion values by repeating step iv.) until a stop criterion is satisfied, wherein the at least two optical surfaces comprise at least a front and a back surface;
  vi. calculating by optimization the optical system; and
  vii. surface machining at least one optical surface in accordance with said calculated optical system.

2. The method according to claim 1, wherein the cost function is a sum over the criteria selected in step i.) of:
  sums, over the evaluation domains of step ii.) or differences between a criterion value associated with an evaluation domain of step ii.) and the target value associated with said evaluation domain to the power of two, for criteria selected in step i.) belonging to the central vision and peripheral vision criteria groups, and
  differences between a criterion value and a target value of step ii.) to the power of two, for criteria selected in step i.) belonging to the general criteria group.

3. The method according to claim 1, wherein the criterion selected in step i.) belongs to the central vision criteria group and wherein the associated evaluation domains of step ii.) comprise at least one gaze direction, said direction being considered with regard to reference axes associated with the eye rotation center and used to perform ray tracing from the eye rotation center for the criterion evaluation.

4. The method according to claim 3, wherein the criterion selected in step i.) belongs to any of: ocular deviation, pupil field ray deviation, prismatic deviation in peripheral vision, magnification in peripheral vision, and wherein the associated evaluation domains consist in one direction.

5. The method according to claim 3, wherein the criterion selected in step i.) belongs to any of object visual angular field in central vision, image visual angular field in central vision, object visual angular field in peripheral vision and image visual angular field in peripheral vision, and wherein the associated evaluation domains comprise of at least two directions.

6. The method according to claim 3, wherein the criterion selected in step i.) is defined either by a variation of the criterion selected in step i.) belonging to the central vision criteria group or by a variation of the criterion selected in step i.) belonging to the peripheral vision criteria group.

7. The method according to claim 1, wherein a selected criterion of step i.) belongs to the peripheral vision criteria group and the associated evaluation domains of step ii.) comprise at least one peripheral ray direction, said direction being considered with regard to reference axes associated with the entrance pupil center moving along a determined gaze direction and used to perform ray tracing from the entrance pupil center for the criterion evaluation.

8. The method according to claim 7, wherein the criterion selected in step i.) belongs to any of: ocular deviation, pupil field ray deviation, prismatic deviation in peripheral vision, or magnification in peripheral vision, and wherein the associated evaluation domains consist in one direction.

9. The method according to claim 7, wherein the criterion selected in step i.) belongs to any of object visual angular field in central vision, image visual angular field in central vision, object visual angular field in peripheral vision or image visual angular field in peripheral vision, and wherein the associated evaluation domains comprise of at least two directions.

10. The method according to claim 7, wherein the criterion selected in step i.) is defined either by a variation of the criterion selected in step i.) belonging to the central vision criteria group or by a variation of the criterion selected in step i.) belonging to the peripheral vision criteria group.

11. The method according to claim 1, wherein the cost function J is mathematically expressed according to:

$$J(v) = \sum_{k=1}^{N1} \sum_{i=1}^{Mk} w_k^i * (H_k(D_k^i, v) - T_k^i)^2 + \sum_{k=1}^{N2} w_k' * (H_k'(v) - T_k')^2,$$

wherein:

k and i are integer variables, $N_1$ is an integer superior or equal to 1 and represents the number of criteria selected in step i.) belonging to the central vision and peripheral vision criteria groups;

$N_2$ is an integer superior or equal to 1 and represents the number of criteria selected in step i.) belonging to the general criteria group;

$M_k$ is an integer superior or equal to 1 and represents the number of evaluation domains of step ii.) for the criterion selected in step i.) belonging to the central vision or peripheral vision criteria groups of index k;

v is defining the working optical system parameters;

$w_k^i$ are the weights associated with the criterion selected in step i.) belonging to the central vision or peripheral vision criteria groups of index k and to an evaluation domain of step ii.) of index i;

$w_k'$ is the weight associated with the criterion selected in step i.) belonging to the general criteria group of index k $D_k^i$ is an evaluation domain of step ii.) of index i of an evaluation zone associated with a criterion belonging to the central vision or peripheral vision criteria groups of index k;

$H_k$ associates a criterion value to the criterion selected in step i.) belonging to the central vision or peripheral vision criteria groups of index k an evaluation domain of step ii.) $D_k^i$ and an optical system defined by its parameters v;

$H_k'$ associates a criterion value to the criterion selected in step i.) belonging to the general criteria group of index k and an optical system defined by its parameters v;

$T_k^i$ is a target value of index i of the set of target values associated with an evaluation domain of step ii.) $D_k^i$, of a criterion belonging to the central vision or peripheral vision criteria groups of index k; and $T_k'$ is the target value associated with a criterion belonging to the general criteria group of index k.

12. An apparatus capable of carrying out steps i.) to vii.) of claim 1.

13. The method according to claim 1, wherein the central vision criteria group further comprises astigmatism criterion and/or power criterion.

14. The method according to claim 1, wherein the optical system is a progressive addition lens and the central vision criteria group further comprises add power criterion.

* * * * *